United States Patent [19]

Vadas

[11] Patent Number: 5,709,412
[45] Date of Patent: Jan. 20, 1998

[54] APPARATUS FOR CONNECTING TUBES

[76] Inventor: John P. Vadas, c/o JPV Services, 7206 Southeastern Ave., Hammond, Ind. 46324-2132

[21] Appl. No.: 538,443

[22] Filed: Oct. 3, 1995

[51] Int. Cl.$^6$ ........................................ F16L 3/04
[52] U.S. Cl. .................. 285/158; 285/192; 285/260; 285/332
[58] Field of Search ........................ 285/260, 332, 285/371, 158, 192

[56] References Cited

U.S. PATENT DOCUMENTS

| | | | |
|---|---|---|---|
| 2,759,692 | 8/1956 | Bohl et al. | 285/260 X |
| 3,084,684 | 4/1963 | Saunders | 285/260 X |
| 3,128,476 | 4/1964 | Lash | 285/260 X |
| 3,140,495 | 7/1964 | Gottwik | 285/260 X |
| 3,484,121 | 12/1969 | Quinton | 285/332 X |
| 4,015,961 | 4/1977 | Howard et al. | 285/260 X |
| 4,253,500 | 3/1981 | Williams | 285/332 X |
| 5,286,067 | 2/1994 | Choksi | 285/332 X |

FOREIGN PATENT DOCUMENTS

| | | | |
|---|---|---|---|
| 825564 | 10/1969 | Canada | 285/260 |
| 1214468 | 12/1970 | United Kingdom | 285/260 |
| 1439796 | 6/1976 | United Kingdom | 285/332 |

*Primary Examiner*—Dave W. Arola
*Attorney, Agent, or Firm*—Michael R. McKenna

[57] ABSTRACT

A tube connection apparatus for use with larger diameter flexible tubing particularly for hazardous material removal comprising an outer tapered sleeve and an inner tapered sleeve that is sized to snugly fit within the outer tapered sleeve and to engage the flexible tubing therebetween. A retainer ring is provided to secure a second flexible tube to the outer tapered sleeve and a transportable wall section which holds the sleeves may be positioned in a passageway of a building and tubing from spaces on either side of the passageway be connected.

17 Claims, 2 Drawing Sheets

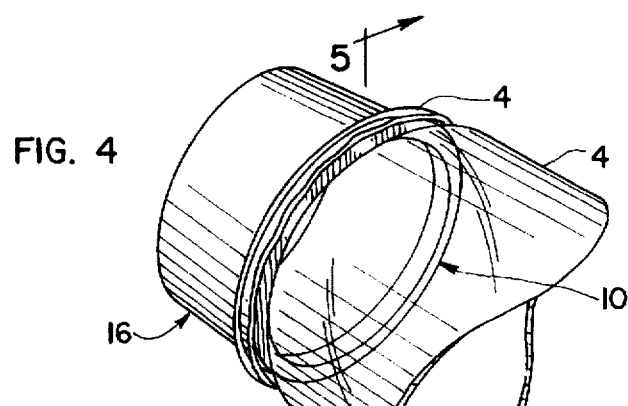
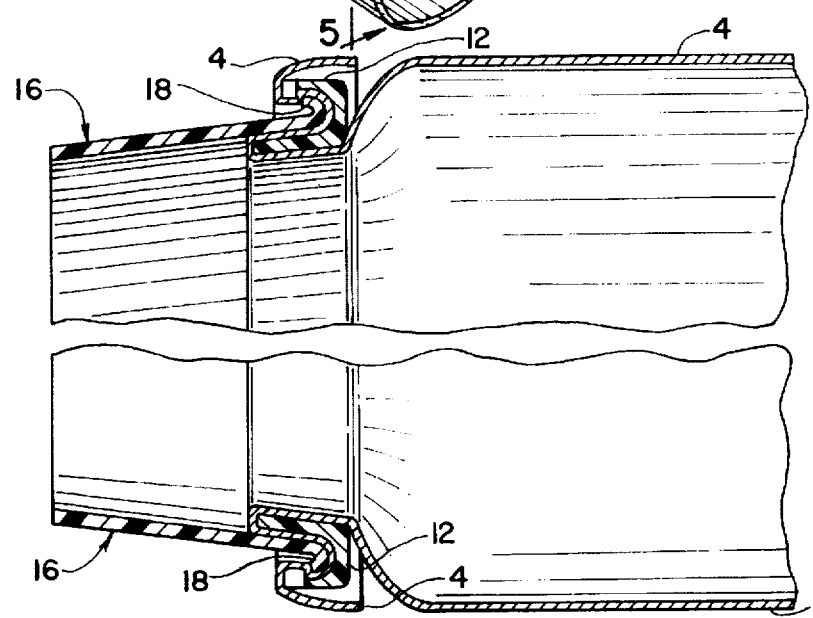
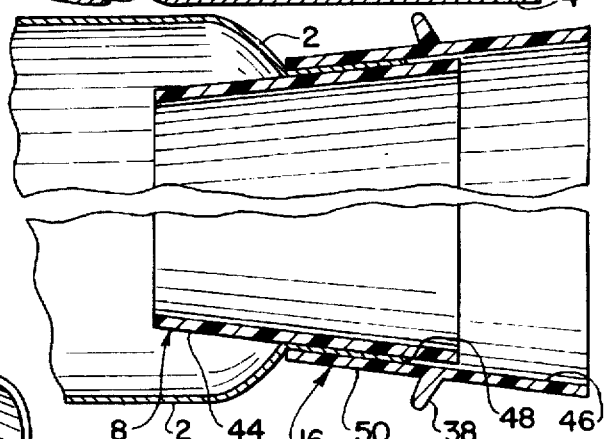
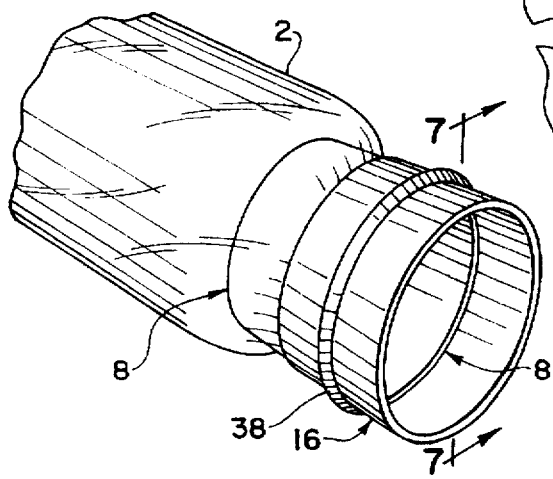

APPARATUS FOR CONNECTING TUBES

BACKGROUND OF THE INVENTION

This invention relates to a tube connector for larger diameter flexible tubing which is used in industrial applications for removing hazardous waste materials including asbestos from buildings constructed in eras gone by.

There are many types of tube connectors known for various tubing. Moreover, there are make-shift field installations for larger diameter flexible tubing using spray adhesives, staples, and duct tape which the current invention is designed to replace.

A representative tube connector is shown in U.S. Pat. No. 3,207,538 issued in 1965 to Pattillo provides a clamp type connector for sheet metal. Another design is shown in U.S. Pat. No. 2,944,840 issued in 1960 to Wiltse which utilizes a tube coupling having a reinforced seal and locking rings. U.S. Pat. No. 5,316,350 issued in 1994 to Kolenbrandt et. al. discloses a tubing with two projecting members for joining and an undercut that receives a locking member of the tube. Unlike the instant invention, Kolenbrandt et. al. is designed for attaching sockets to a tube as opposed to joining tubes by a connector, as is taught by the instant invention.

U.S. Pat. No. 5,333,910 issued in 1994 to Bailey discloses a hose fitting with ring holder having a conically shaped receiving end adapted to receive a flexible hose with a shallow groove for storing an elastic ring which secures the union. Also see U.S. Pat. No. 4,579,375 issued to Fischer et. al. in 1986 for sheet metal duct system having a transverse flange and circumferential clipping means. Furthermore, of general interest are U.S. Pat. No. 4,451,070 issued to Sauer in 1984 for a hose coupling involving an overlapping external collar with an elastic clamping means; U.S. Pat. No. 3,891,250 issued to Oetiker in 1975 for a tubular hose connection and external clamping with overlapping tubular members and an external clamp ring.

See also U.S. Pat. No. 4,037,682 issued to Thorpe et. al. in 1977 for flexible ducting joint employing an arrangement of single ring and interlocking pair of parallel rings with an external binder.

Some of the drawbacks of these designs are that they require tools for connecting and are not designed to connect larger diameter (on the order of magnitude of 12 inches) flexible tubing. They are limited in their use with standard cylindrical tubes with augmented nubs or flanges which are utilized by some of the above patents to lock the tubing in place and assembled tube connection apparatus is easily detachable for removal and disassembly.

To alleviate this problem, and others which will become apparent from the disclosure which follows, the present invention conveniently connects two sections of flexible tubing without the need for tools.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

Unlike the foregoing devices which teach coupling devices that support specially fabricated tubing having nubs, recesses, and locking structures, the instant invention connects standard industrial larger diameter tubing detachably without the need for tools.

The instant invention provides an efficient and convenient means of detachably connecting larger diameter tubing in the field for the removal of hazardous material. Because the connection provided by this invention will not give way during use, as current systems with adhesive and tape do, a safety advantage results.

Still other advantages will be apparent from the disclosure that follows.

SUMMARY OF THE INVENTION

The invention relates to a tube connection apparatus for use with flexible tubing comprising an outer tapered sleeve and an inner tapered sleeve that is sized to snugly fit within the outer tapered sleeve and to engage the flexible tubing therebetween.

The present invention discloses an inner tapered sleeve having a proximal end with a proximal opening and a distal end with a distal opening that is generally smaller than the proximal opening, and an outer tapered sleeve having a proximal end with a proximal opening and a distal end with a distal opening that is generally smaller than the proximal opening, the proximal end of the inner tapered sleeve having an outside dimension that is larger than the distal opening of the outer tapered sleeve, whereby, the distal end of the inner tapered sleeve may be inserted into the proximal opening of the outer tapered sleeve and moved in the direction of the distal end of the outer tapered sleeve to affect a snug fit between at least a portion of an outer surface of the inner tapered sleeve and at least a portion of an inner surface of the outer tapered sleeve.

In a preferred embodiment of the invention the inner tapered sleeve has a generally conical shaped outer surface and the outer tapered sleeve has a generally conical shaped inner surface.

BRIEF DESCRIPTION OF THE DRAWINGS

Preferred embodiments of the invention are described hereinafter with reference to the accompanying drawing wherein:

FIG. 4. is a perspective view of a preferred embodiment of the present invention showing a second flexible tube attached to the outer tapered sleeve with a ring;

FIG. 5. is a fragmented side elevation view taken along the line of 5—5 of FIG. 4 showing details of the engagement of the outer tapered sleeve, the flexible tubing and the ring;

FIG. 6. is a perspective view of a preferred embodiment of the present invention showing a flexible tube secured between a portion of the outer surface of the inner tapered sleeve and a portion of the inner surface of the outer tapered sleeve with said outer tapered sleeve having a stiffening ring disposed circumferentially; and FIG. 7. is a fragmented side elevation view taken along the line of 7—7 of FIG. 6 showing the engagement between a portion of the outer surface of the inner tapered sleeve engaged with a portion of the inner surface of the outer tapered sleeve with an end portion of the flexible tube disposed therebetween.

DETAILED DESCRIPTION OF THE INVENTION

Figure 1:
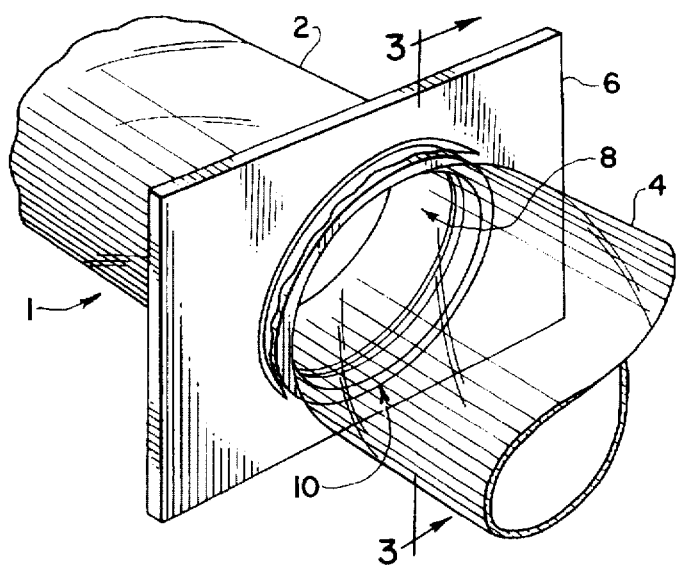
FIG. 1. is a perspective view of a preferred embodiment of the apparatus for connecting tubes of the present invention showing two transparent flexible tubes connected to said apparatus including the supporting wall section.

Without departing from the generality of the invention disclosed herein and without limiting the scope of the invention, the discussion that follows, will refer to the invention as depicted in the drawing.

The preferred embodiments depicted in the drawing include a tube connection apparatus 1 for use with flexible tubing 2. As best shown in FIGS. 6 and 7, one means for connecting comprises an outer tapered sleeve 16 and an inner tapered sleeve 8 that is sized to snugly fit within the outer tapered sleeve and to engage the flexible tubing 2 therebetween. A second means for connecting comprises the outer tapered sleeve 16 having a flange 18 disposed on the rim 40 of the larger opening and a ring 10 adapted to engage the flange 18 with another flexible tubing 4 secured between the ring 10 and the flange 18, as shown in FIGS. 4 and 5.

Figure 3:
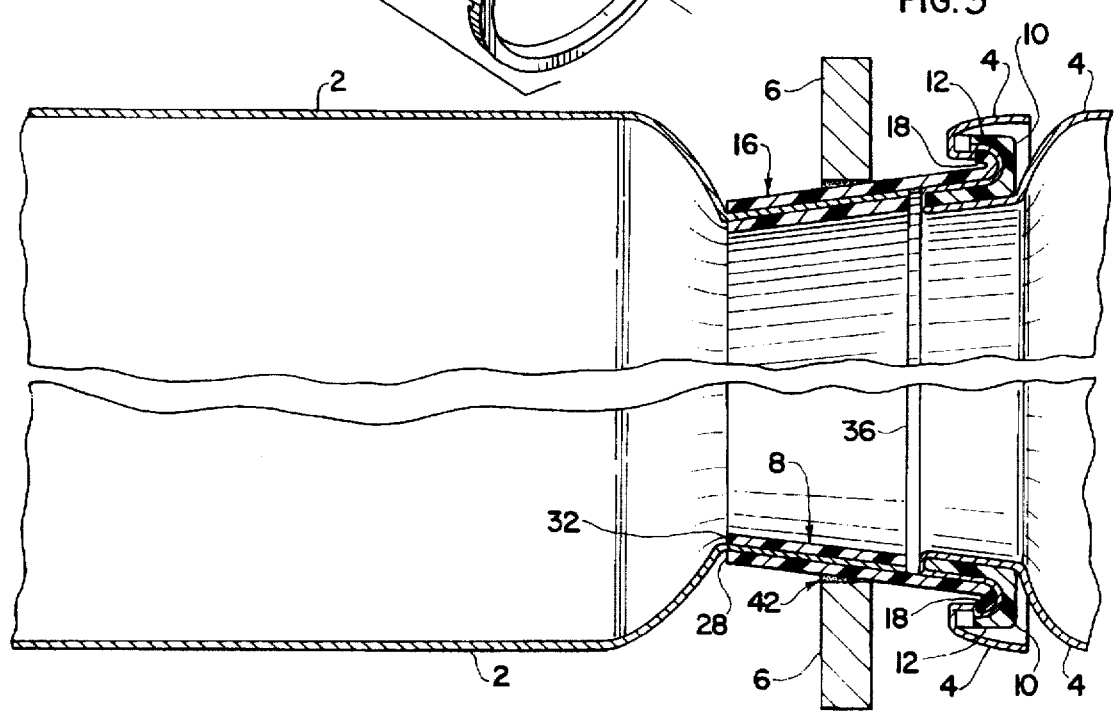
FIG. 3. is a fragmented side elevation view taken along the line 3—3 of FIG. 1 showing a first flexible tube disposed between the inner tapered sleeve and the outer tapered sleeve, and a second flexible tube connected to the outer tapered sleeve by a ring.

Referring to FIG. 3, there is shown a wall section 6 which has at least one aperture 42 sized to secure the outer tapered sleeve 16. The wall section 6 may be secured within the passageway (such as a door or a window) of a building, a vehicle or other structure having a wall with an opening, and the tubes from spaces on either side of the passageway may be connected.

Without departing from the generality of the invention disclosed herein, the wall section 6 may have a plurality of apertures 42, each of which may receive an outer tapered sleeve 16. The discussion that follows, without limiting the scope of the invention, will refer to the invention as depicted in the drawing, showing an apparatus that will accommodate two flexible tubes. The invention relates to a tube connection apparatus 1 for use with flexible tubing comprising an outer tapered sleeve 16 and an inner tapered sleeve 8 that is sized to snugly fit within the outer tapered sleeve 16 and to engage the flexible tubing 2 therebetween. See FIGS. 6 and 7.

Figure 2:
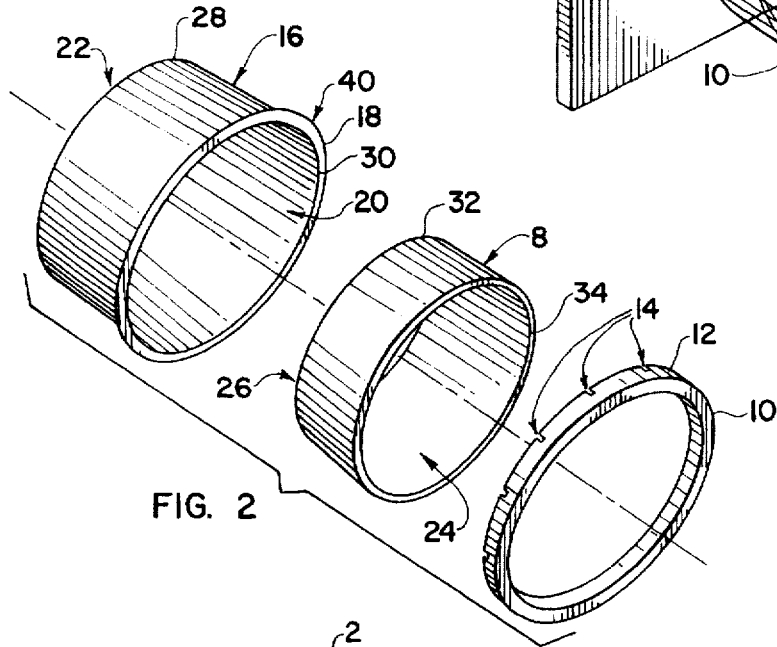
FIG. 2. is an exploded perspective view of the outer tapered sleeve, the inner tapered sleeve and the ring.

Referring to FIG. 2, there is shown a preferred embodiment of the tube connection apparatus wherein an inner tapered sleeve 8 having a proximal end 34 with a proximal opening 24 and a distal end 32 with a distal opening 26 that is generally smaller than the proximal opening 24 is revealed, and an outer tapered sleeve 16 having a proximal end 30 with a proximal opening 20 and a distal end 28 with a distal opening 22 that is generally smaller than the proximal opening 20, the proximal end 34 of the inner tapered sleeve 8 having an outside diameter that is larger than the distal opening 22 of the outer tapered sleeve 16. The distal end 32 of the inner tapered sleeve 8 may be inserted into the proximal opening 20 of the outer tapered sleeve 16 and moved in the direction of the distal end 28 of the outer tapered sleeve 16 to affect a snug fit between at least a portion of an outer surface 44 of the inner tapered sleeve 8 and at least a portion of an inner surface 46 of the outer tapered sleeve 16, as best shown in FIG. 7.

In a preferred embodiment of the invention, the inner tapered sleeve 8 has a generally conical shaped outer surface 44 and the outer tapered sleeve 16 has a generally conical shaped inner surface 46, as best shown in FIGS. 3 and 7.

In a preferred embodiment of this important invention, a tube connection apparatus 1 for use with at least one flexible tubing 2 comprising an inner tapered sleeve 8 having a proximal end 34 (proximal elements are consistently located on the right side as shown in the drawing) with a proximal opening 24 and a distal end 32 with a distal opening 26 that is smaller than the proximal opening 24, and an outer tapered sleeve 16 having a proximal end 30 with a proximal opening 20 and a distal end 28 with a distal opening 22 that is smaller than the proximal opening 20, the proximal end 34 of the inner tapered sleeve 8 having an outside dimension that is larger than the distal opening 22 of the outer tapered sleeve 16. In this way, a flexible tube 2 having a proximal end with a flow area larger than the distal opening 22 of the outer tapered sleeve 16 may be lockingly secured between at least a portion of the outer surface 44 of the inner tapered sleeve 8 and at least a portion of the inner surface 46 of the outer tapered sleeve 16.

In a preferred embodiment of the tube connection apparatus 1, a flexible tube 2 having a proximal end with a flow area larger than the distal opening 22 of the outer tapered sleeve 16 may be driven through the distal opening 22 of the outer tapered sleeve 16 and the distal end 32 of the inner tapered sleeve 8 may be inserted into the proximal end 48 of the flexible tube 2 and together moved in the direction of the distal end 28 of the outer tapered sleeve 16 to affect a snug fit with a proximal end portion of the flexible tube lockingly secured between at least a portion of the outer surface 44 of the inner tapered sleeve 8 and at least a portion of the inner surface 46 of the outer tapered sleeve 16.

In the best mode currently contemplated of the tube connection apparatus 1, both the outer surface 44 of the inner tapered sleeve 8 and the inner surface 46 of the outer tapered sleeve 16 have a generally conically shape.

Referring to FIG. 7, at least one stiffening ring 38 may be disposed on an outer surface 50 of the outer sleeve 16 to provide strength and rigidity.

In a preferred embodiment of the tube connection apparatus, as shown in FIGS. 1, 3, 4 and 5, a means for connecting a second flexible tube 4 to the proximal end 30 of the outer tapered sleeve 16 is disclosed. An embodiment of which comprises a ring 10 adapted to securingly engage the rim 40 of the proximal opening 20 of the outer tapered sleeve 16. A preferred embodiment of such means comprises an outwardly radiating flange 18 disposed on a rim 40 of the proximal opening 20 of the outer tapered sleeve 16 and a ring 10 adapted to securingly engage the flange 18.

In a preferred embodiment of the means for connecting a second flexible tube 4 to the proximal end 28 of the outer tapered sleeve 16, the means maintains the inner tapered sleeve 8 in the outer tapered sleeve 16.

In the best mode contemplated, the tube connection apparatus 1 will operate most efficiently with a second flexible tubing 4 having a diameter of larger than the distal opening 22 of the outer tapered sleeve 16.

The tubing 2 will have a proximal end portion driven through the distal opening 22 of the outer tapered sleeve 16, and the distal end 32 of the inner tapered sleeve 8 may be inserted into an opening in the proximal end 48 of the flexible tube 2 and moved in the direction (to the left in the drawing) of the distal end 28 of the outer tapered sleeve 16 to affect a snug fit with the proximal end portion of the flexible tube 2 lockingly secured between at least a portion of the outer surface 44 of the inner tapered sleeve 8 and at least a portion of the inner surface 46 of the outer tapered sleeve 16.

As best shown in FIG. 2, the ring 10 has at least one stress releasor for flexibly retaining a second flexible tubing 4 of selected wall thickness to the flange 18. The stress releasor of the ring 10 comprises a partial slit 14 in an outer edge 12 of the ring 10 to allow the ring to expand over the flange 18 and the second flexible tubing 4.

Moreover, in a preferred embodiment of the invention for a tube connection apparatus, a transportable wall section 6 having at least one aperture 42 adapted to receive a lateral section of the outer tapered sleeve 16 is disclosed. See FIGS. 1 and 3. The outer tapered sleeve may be lodged in the aperture 42 of the wall section 6. As best contemplated, the wall section can be suitable sized to fit the passageway of a building. Whereby, the wall section may be secured to a passageway in a building and a flexible tube on one side of the passageway may be connected to a second flexible tube on the other side of the passageway.

In the preferred embodiment shown in FIG. 3 of the drawing the tube connection apparatus for use with at least one flexible tubing comprises an inner tapered sleeve 8 having a generally conical shaped outer surface with a proximal end 34 with a proximal opening 24 and a distal end 32 with a distal opening 26 that is smaller than the proximal opening 24, an outer tapered sleeve 16 having a generally conical shaped outer surface with a proximal end 30 with a proximal opening 20 and a distal end 28 with a distal opening 22 that is smaller than the proximal opening 20. The proximal end 34 of the inner tapered sleeve 8 having an outside dimension that is larger than the distal opening 22 of the outer tapered sleeve 16.

Referring to FIG. 7, a flexible tube 2 having a proximal end 48 with a flow area larger than the distal opening 22 of the outer tapered sleeve 16 may be lockingly secured between at least a portion of the outer surface 44 of the inner tapered sleeve 8 and at least a portion of the inner surface 46 of the outer tapered sleeve 16. At least one stiffening ring 38 disposed on an outer surface 50 of the outer sleeve 16 is disclosed and a means for connecting a second flexible tube 4 to the proximal end 30 of the outer tapered sleeve 16 comprising an outwardly radiating flange 18 disposed on a rim 40 of the proximal opening 20 of the outer tapered sleeve 16 and a ring 10 adapted to securingly engage the flange 18, wherein the ring 10 maintains the inner tapered sleeve 8 in the outer tapered sleeve 16 (i.e. the inner tapered sleeve cannot be withdrawn), and wherein the ring 10 has at least one partial slit 14 in an outer edge 12 of the ring 10 to allow the ring to flexibly expand over the flange 18 and the second flexible tubing 4.

A transportable wall section 6 having at least one aperture 42 adapted to receive a lateral section of the outer sleeve 16, the wall section 6 being suitable sized to fit the passageway of a building. Whereby, the wall section may be secured to a passageway in a building and a flexible tube on one side of the passageway may be connected to a second flexible tube on the other side of the passageway.

A method for connecting flexible tubing is further disclosed comprising the steps of placing an end of a flexible tube having a flow area larger than the smaller opening of an outer tapered sleeve in to the smaller opening of the outer tapered sleeve, inserting the smaller end of an inner tapered sleeve in to the larger opening of the outer tapered sleeve, and moving the inner tapered sleeve in the direction of the smaller opening of the outer tapered sleeve until the flexible tube is lockingly secured between at least a portion of the outer surface of the inner tapered sleeve and at least a portion of the inner surface of the outer tapered sleeve. See FIG. 7.

In a preferred embodiment of the above method for connecting two flexible tubes, the following additional steps are inserting an end of a second flexible tube into a ring that is adapted to securingly engage the larger opening of the outer tapered sleeve, and engaging the ring to the rim of the larger opening of the outer tapered sleeve with the end of the second flexible tube secured between the rim and the ring.

In another preferred embodiment of a method for connecting two flexible tubes is further disclosed comprising the steps of placing an end of a flexible tube having a flow area larger than the smaller opening of an outer tapered sleeve in to the smaller opening of the outer tapered sleeve, inserting the smaller end of an inner tapered sleeve in to the larger opening of the outer tapered sleeve, and moving the inner tapered sleeve in the direction of the smaller opening of the outer tapered sleeve until the flexible tube is lockingly secured between at least a portion of the outer surface of the inner tapered sleeve and at least a portion of the inner surface of the outer tapered sleeve.

Additionally, the foregoing methods for connecting may further include the following additional step of receiving a lateral section of the outer tapered sleeve in an aperture disposed in a transportable wall section.

As previously mentioned the securing of the transportable wall section in a passageway in a building, a vehicle or other structure is also disclosed.

When the passageway is a door in a building, flexible tubes from different rooms may be connected. When the passageway is a window of a building, a flexible tube in the building may be connected with a second flexible tube from outside of the building. Thus, a flexible tube on one side of the passageway may be connected to a second flexible tube on the other side of the passageway.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The wall section can be constructed from any suitable material of construction which can support the tube connection apparatus, associated flexible tubing and the flow of fluid therethrough.

The tube connection apparatus can be made from a high density polyethylene industrial can of the type made by Ropak Corporation of California that has a lid and a generally conical sidewall tapering inwardly from a top rim having an outwardly radiating flange to a bottom surface. The inner tapered sleeve is a bottom portion of the industrial can after laterally cutting said bottom portion from the industrial can and removing said bottom surface. The outer tapered sleeve is the remaining conical portion of the industrial can with the bottom portion removed. The bottom end of the inner tapered sleeve may be inserted into a top opening defined by the top rim of the outer tapered sleeve and moved in the direction of the opposite end of the outer tapered sleeve to affect a snug fit between at least a portion of an outer surface of the inner tapered sleeve and at least a portion of an inner surface of the outer tapered sleeve.

Furthermore, the means for connecting a second flexible tube to the proximal end of the outer tapered sleeve comprises the outwardly radiating flange disposed on the top rim of the outer tapered sleeve and a ring made from the lid after cutting away a central portion of said lid and further cutting at least one partial slit in an outer edge of the ring to allow said ring to flexibly expand over the flange and the second flexible tubing.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tube connection apparatus for use with flexible tubing comprising:
   a. an inner tapered sleeve having a proximal end with a proximal opening and a distal end with a distal opening that is generally smaller than the proximal opening; and
   b. an outer tapered sleeve having a proximal end with a proximal opening and a distal end with a distal opening that is generally smaller than the proximal opening,
   said proximal end of the inner tapered sleeve having an outside dimension that is larger than the distal opening of the outer tapered sleeve;
   the distal end of the inner tapered sleeve being inserted into the proximal opening of the outer tapered sleeve and moved in the direction of the distal end of the outer tapered sleeve to affect a snug fit between at least a portion of an outer surface of the inner tapered sleeve and at least a portion of an inner surface of the outer tapered sleeve; and
   the flexible tubing comprises a first flexible tube that passes over the distal end of the inner tapered sleeve which is lockingly secured between at least a portion of the outer surface of the inner tapered sleeve and at least a portion of the inner surface of the outer tapered sleeve and said first flexible tube extends outwardly from the distal end of the outer tapered sleeve which is snugly fit to the inner tapered sleeve.

2. A tube connection apparatus for use with flexible tubing comprising:
   a. an inner tapered sleeve having a generally smooth conical shaped outer surface with a proximal end having a proximal opening and a distal end having a distal opening with a diameter smaller than the diameter of the proximal opening; and
   b. an outer tapered sleeve having a generally smooth conical shaped inner surface with a proximal end having a proximal opening and a distal end having a distal opening with a diameter smaller than the diameter of the proximal opening,
   said proximal end of the inner tapered sleeve having an outside diameter that is larger than the diameter of the distal opening of the outer tapered sleeve,
   said distal end of the inner tapered sleeve being inserted into the proximal opening of the outer tapered sleeve and moved toward the distal end of the outer tapered sleeve to affect a snug fit between the outer surface of the inner tapered sleeve and the inner surface of the outer tapered sleeve;
   the flexible tubing comprises a first flexible tube that is suitably sized and shaped:
      to have a proximal end with a flow area larger than the distal opening of the outer tapered sleeve;
      to flexibly pass the proximal end of the first flexible tube through the distal end of the outer sleeve;
      to have the distal end of the inner tapered sleeve pass through the proximal end of the flexible tube until the flexible tube is lockingly secured between at least a portion of the outer surface of the inner tapered sleeve and at least a portion of the inner surface of the outer tapered sleeve.

3. A tube connection apparatus for use with at least one flexible tubing comprising:
   a. an inner tapered sleeve having a proximal end with a proximal opening and a distal end with a distal opening that is smaller than the proximal opening; and
   b. an outer tapered sleeve having a proximal end with a proximal opening and a distal end with a distal opening that is smaller than the proximal opening,
   said proximal end of the inner tapered sleeve having an outside dimension that is larger than the distal opening of the outer tapered sleeve,
   said distal end of the inner tapered sleeve being inserted into the proximal opening of the outer tapered sleeve and moved in the direction of the distal end of the outer tapered sleeve to affect a snug fit between at least a portion of an outer surface of the inner tapered sleeve and at least a portion of an inner surface of the outer tapered sleeve,
   the at least one flexible tubing comprises a first flexible tube that is suitably sized and shaped:
      to have a proximal end with a flow area larger than the distal opening of the outer tapered sleeve;
      to flexibly pass the proximal end of the first flexible tube through the distal end of the outer sleeve;
      to have the distal end of the inner tapered sleeve pass through the proximal end of the flexible tube until the flexible tube is lockingly secured between at least a portion of the outer surface of the inner tapered sleeve and at least a portion of the inner surface of the outer tapered sleeve.

4. The tube connection apparatus of claim 3, wherein both the outer surface of the inner tapered sleeve and the inner surface of the outer tapered sleeve have a generally conical in shape.

5. The tube connection apparatus of claim 3, further comprising at least one stiffening ring disposed on an outer surface of the outer sleeve.

6. The tube connection apparatus of claim 3, further comprising a means for connecting a second flexible tube to the proximal end of the outer tapered sleeve.

7. The tube connection apparatus of claim 6, further comprising a transportable wall section having at least one aperture suitably sized and shaped to receive a lateral section of the outer sleeve, said outer sleeve being lodged in the aperture of the transportable wall section.

8. The tube connection apparatus of claim 7, wherein the transportable wall section is suitably sized and shaped to fit a passageway of a building, said wall section being secured to the passageway in a building with the first flexible tube extending from one side of the passageway connected to the second flexible tube extending from the other side of the passageway.

9. The tube connection apparatus of claim 6, wherein the means for connecting a second flexible tube to the proximal end of the outer tapered sleeve maintains the inner tapered sleeve in the outer tapered sleeve.

10. The tube connection apparatus of claim 6, wherein the means for connecting a second flexible tube to the proximal end of the outer tapered sleeve comprises an outwardly radiating flange disposed on a rim of the proximal opening of the outer tapered sleeve and a ring for securingly engaging the second flexible tube to said flange.

11. The tube connection apparatus of claim 10, wherein the ring has at least one stress releasor for flexibly retaining a second flexible tubing of selected wall thickness to the flange.

12. The tube connection apparatus of claim 11, wherein the stress releasor of the ring comprises a partial slit in an outer edge of the ring to allow said ring to expand over the flange and the second flexible tubing.

13. The tube connection apparatus of claim 3, wherein the proximal opening of the outer tapered sleeve is defined by a rim having an outwardly radiating flange.

14. The tube connection apparatus of claim 13, further comprising a ring for securingly engaging the flange.

15. The tube connection apparatus of claim 14, wherein the ring for securingly engaging a second flexible tube to the flange, said second flexible tube having a distal end with a flow area larger than the proximal opening of the outer tapered sleeve being lockingly secured between the flange of the outer tapered sleeve and the ring.

16. The tube connection apparatus of claim 3, further comprising a transportable wall section having at least one aperture suitably sized and shaped to receive a lateral section of the outer sleeve, said outer sleeve being lodged in the aperture of the transportable wall section.

17. A tube connection apparatus for use with at least one flexible tubing comprising:

a. an inner tapered sleeve having a generally conical shaped outer surface with a proximal end having a proximal opening and a distal end with a distal opening that is smaller than the proximal opening;

b. an outer tapered sleeve having a generally conical shaped outer surface with a proximal end having a proximal opening and a distal end with a distal opening that is smaller than the proximal opening, said proximal end of the inner tapered sleeve having an outside dimension that is larger than the distal opening of the outer tapered sleeve, said at least one flexible tubing having a proximal end with a flow area larger than the distal opening of the outer tapered sleeve, said at least one flexible tubing being lockingly secured between at least a portion of the outer surface of the inner tapered sleeve and at least a portion of the inner surface of the outer tapered sleeve;

c. at least one stiffening ring disposed on an outer surface of the outer sleeve;

d. a means for connecting a second flexible tube to the proximal end of the outer tapered sleeve comprising an outwardly radiating flange disposed on a rim of the proximal opening of the outer tapered sleeve and a ring securingly engaging the second flexible tube to said flange, wherein the ring maintains the inner tapered sleeve in the outer tapered sleeve, and wherein the ring has at least one partial slit in an outer edge of the ring to allow said ring to flexibly expand over the flange and the second flexible tubing;

e. a transportable wall section having at least one aperture suitably sized and shaped to receive a lateral section of the outer sleeve, said wall section being suitable sized to fit the passageway of a building, said wall section being secured to the passageway in a building with the first flexible tube extending from one side of the passageway connected to the second flexible tube extending from the other side of the passageway.

* * * * *